Figure 1:
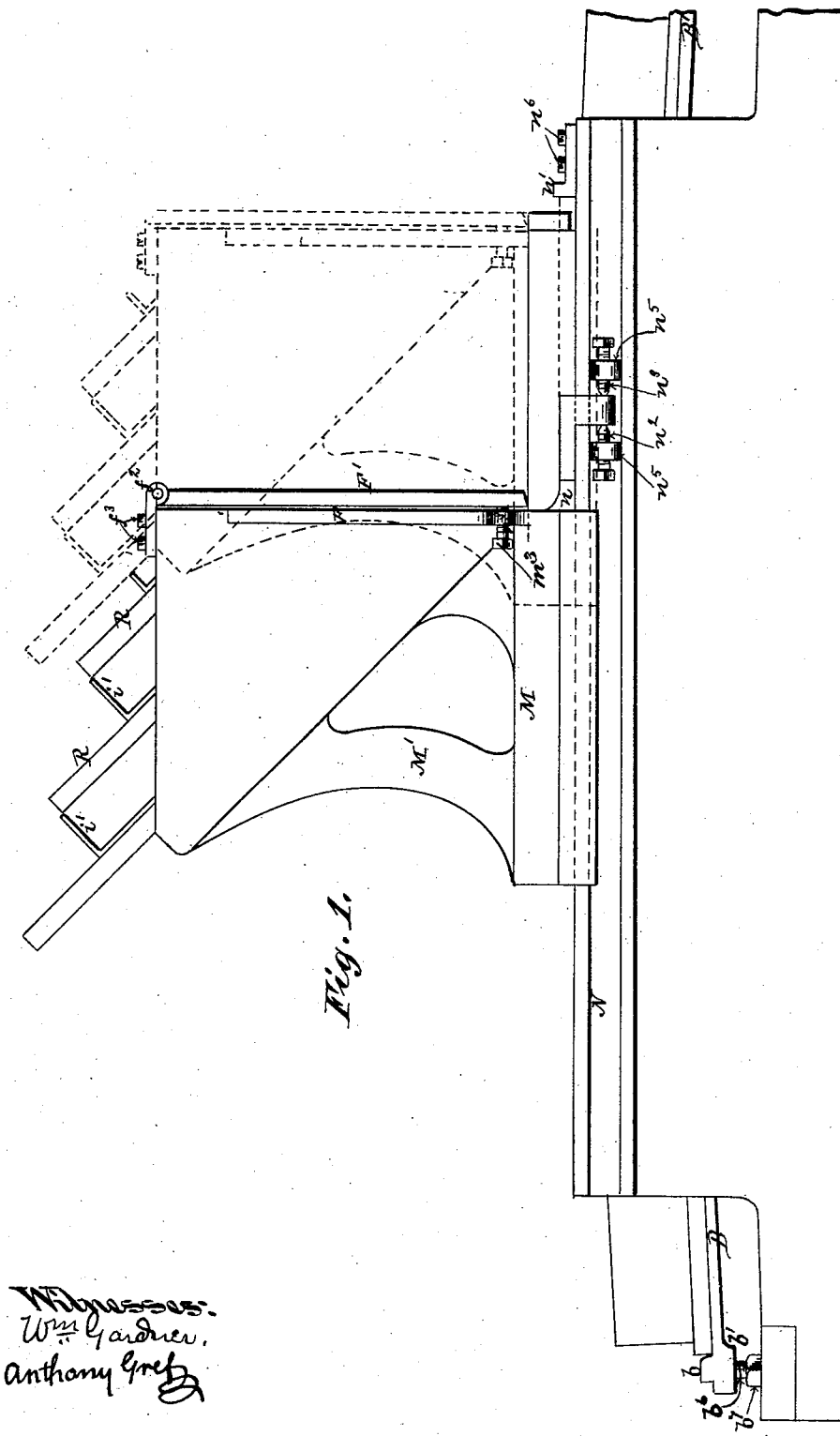

(No Model.) 6 Sheets—Sheet 2.

L. K. JOHNSON & A. A. LOW.
TYPE DISTRIBUTING APPARATUS.

No. 391,798. Patented Oct. 30, 1888.

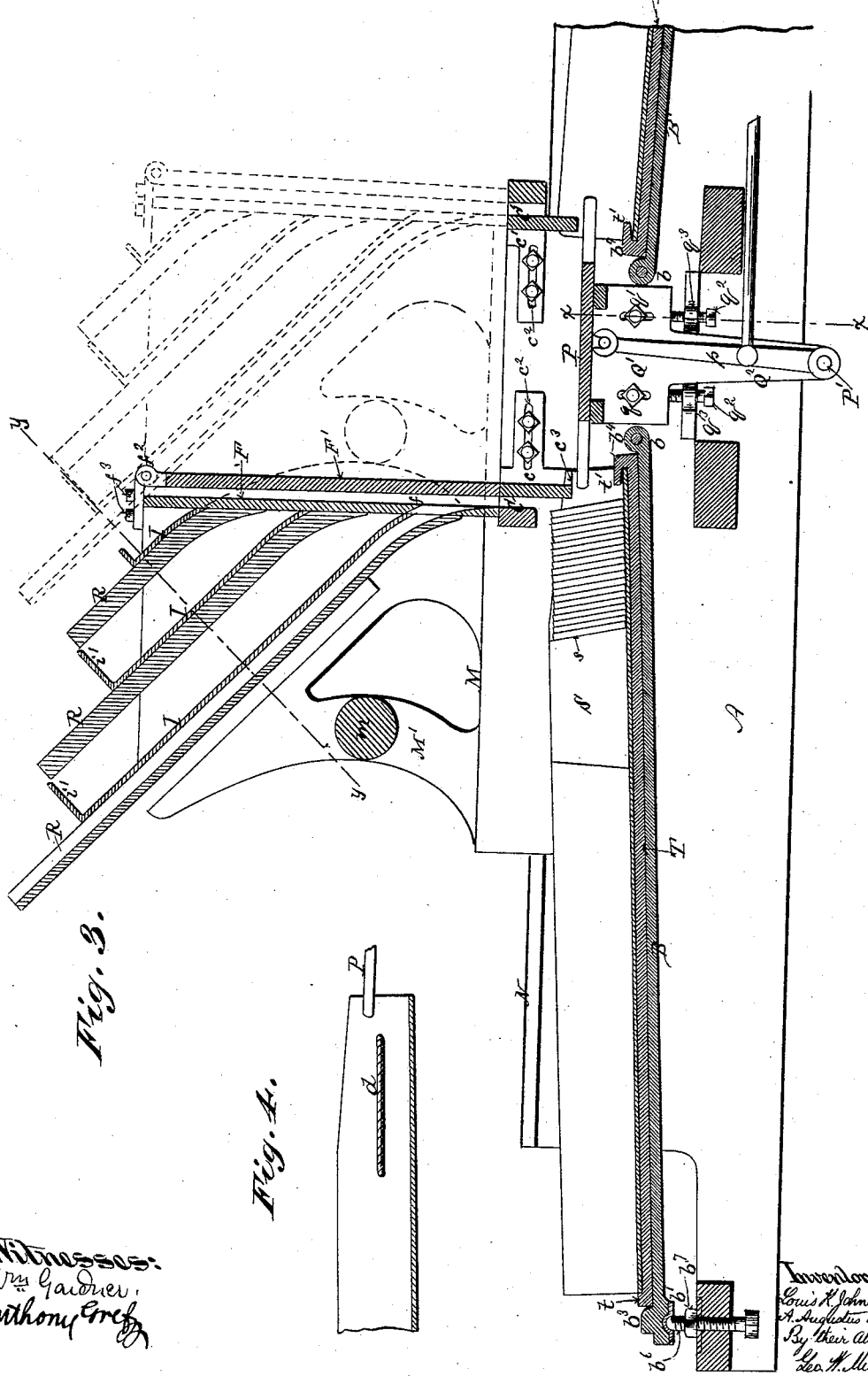

(No Model.)
6 Sheets—Sheet 4.
L. K. JOHNSON & A. A. LOW.
TYPE DISTRIBUTING APPARATUS.
No. 391,798. Patented Oct. 30, 1888.
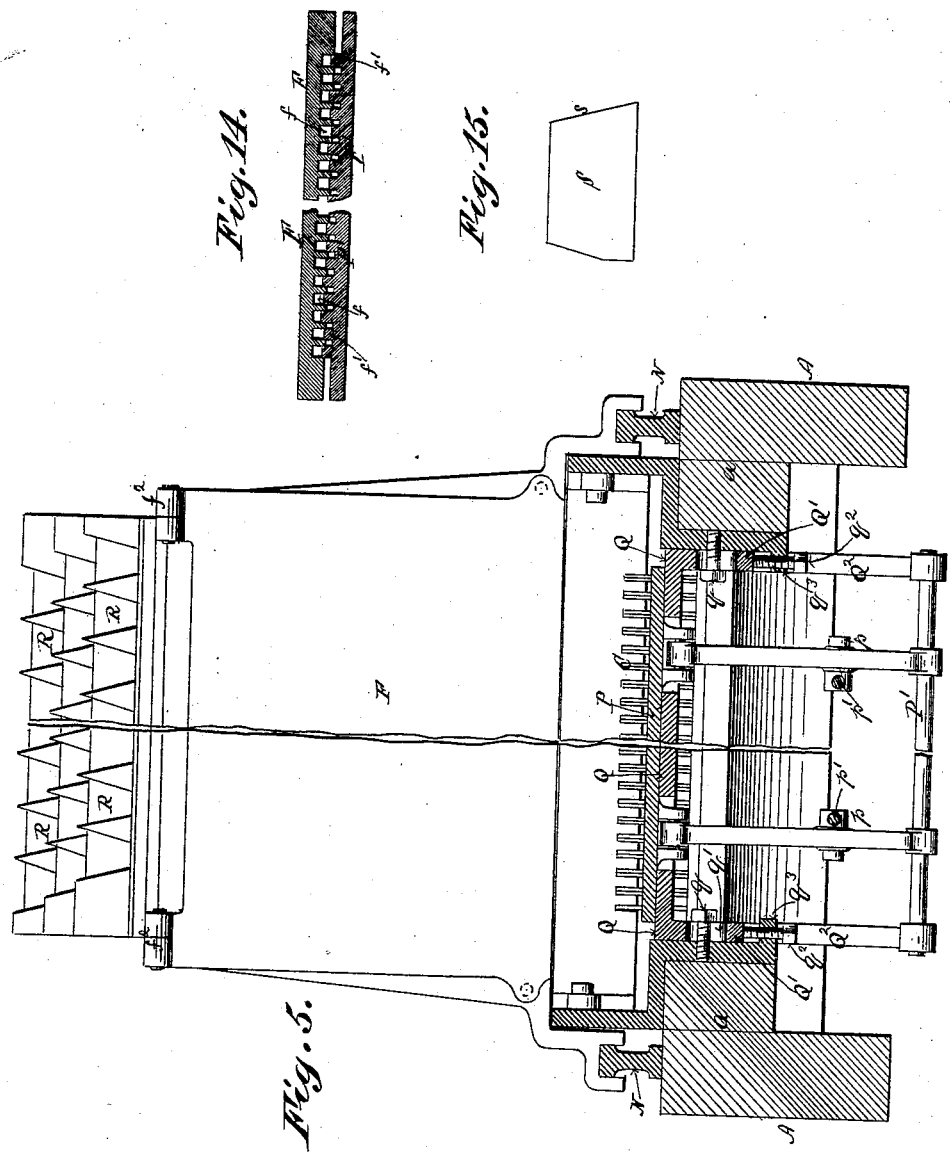

(No Model.) 6 Sheets—Sheet 5.
L. K. JOHNSON & A. A. LOW.
TYPE DISTRIBUTING APPARATUS.
No. 391,798. Patented Oct. 30, 1888.
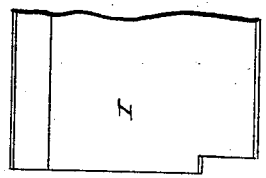
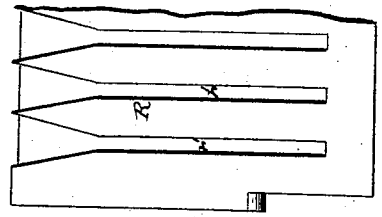
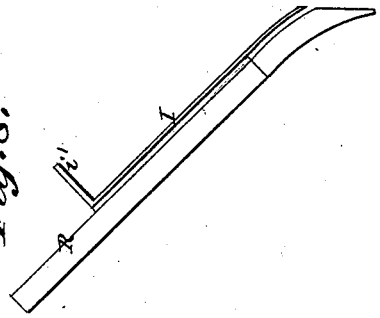
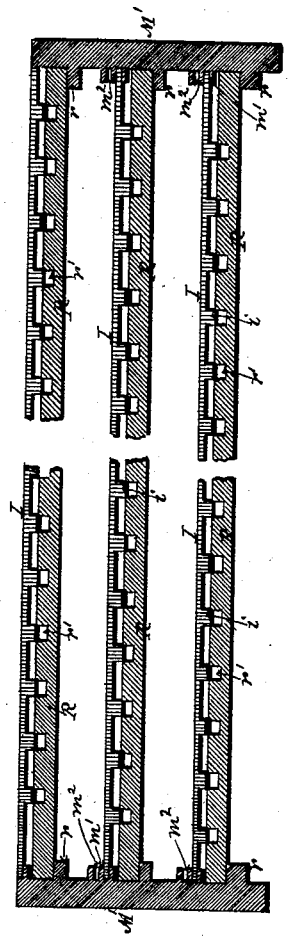
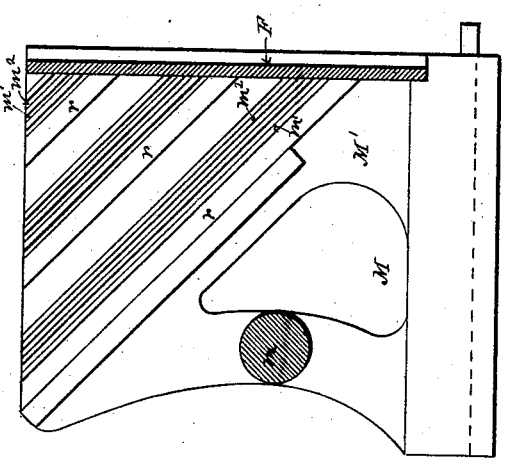
Witnesses:
Wm Gardner
Anthony Greg
Inventors:
Louis K. Johnson
A. Augustus Low
By their Attorney
Geo. H. Miatt (No Model.)  6 Sheets—Sheet 6.
L. K. JOHNSON & A. A. LOW.
TYPE DISTRIBUTING APPARATUS.
No. 391,798.  Patented Oct. 30, 1888.
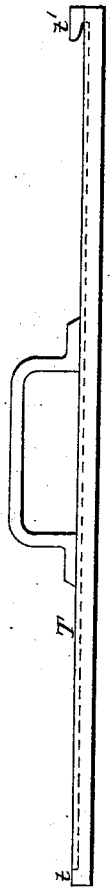
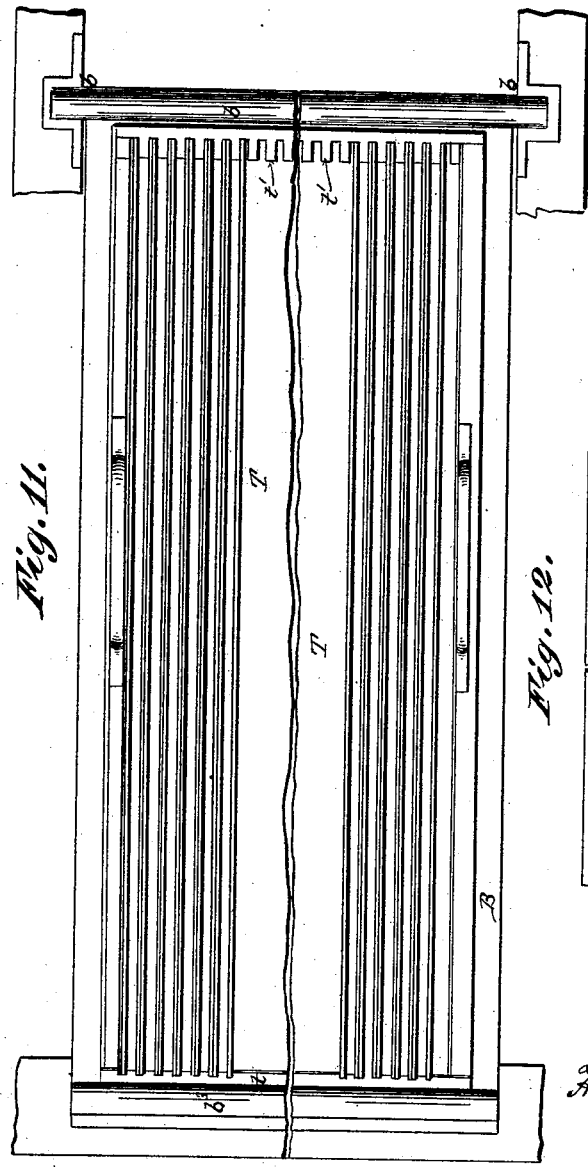
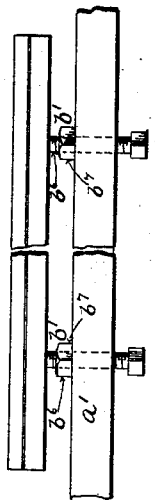
N. PETERS, Photo-Lithographer, Washington, D. C.

UNITED STATES PATENT OFFICE.

LOUIS K. JOHNSON AND A. AUGUSTUS LOW, OF BROOKLYN, ASSIGNORS TO THE ALDEN TYPE MACHINE COMPANY, OF NEW YORK, N. Y.

TYPE-DISTRIBUTING APPARATUS.

SPECIFICATION forming part of Letters Patent No. 391,798, dated October 30, 1888.

Application filed July 3, 1886. Serial No. 207,020. (No model.)

*To all whom it may concern:*

Be it known that we, LOUIS K. JOHNSON and A. AUGUSTUS LOW, citizens of the United States, residing in the city of Brooklyn, in the county of Kings and State of New York, have invented certain new and useful Improvements in Type-Distributing Apparatus, of which the following is a full, clear, and exact description, sufficient to enable others skilled in the art to which it appertains to make and use the same.

Our invention, although applicable to type-distributing apparatus of various kinds, is especially adapted to the class of apparatus and to the method of type distribution set forth in our several patents and applications for patent, among which reference may be had to Patents Nos. 264,085, 282,988, 336,645, 337,406, and 340,124.

An important feature in our present invention consists in the special means employed whereby the types as received in the type-containing channels are caused to assume an angle which prevents their turning upon their longitudinal axes and tends to control them until they are forwarded into contact with the anti-backlash cords or lateral holders in the side walls of the channels. The inclination thus imparted also, in conjunction with the anti-backlash cord, situated slightly below the middle height of the type and immediately below the plane of action of the pusher, tends constantly to counteract all vibration or looseness in the type line or column. The inclination of the types here referred to is attained mainly by the use of a slug or type-preceder having an inclined type edge, and is contributed to and maintained by the low anti-backlash cord which tends to retard the heels or lower portions of the types while they are being forwarded by the action of the pusher. In order to attain with accuracy the most advantageous angle of inclination for the types in the type-containing channels, we pivotally suspend the inner ends of the type-channel beds and support their outer ends by means which are adjustable vertically.

We are aware that in our application No. 156,604 we make the inner ends of the type-channel beds adjustable vertically with relation to the type-conduit plate, and we do not seek herein to cover, broadly, an adjustable type-channel bed, but confine ourselves to the special purpose and construction shown and described. It will be noticed that in the present case the object of adjustment, as well as the method, are different from that shown in the application referred to, in which the inner ends of the type-containing channels are adjusted with relation to the lower extremities of type-conduits which are movable, whereas in our present case the lower extremities of the type-conduits are stationary, and the adjustment of the outer ends is purely for the purpose of regulating and controlling the forwarding of the types.

Another feature of our invention in this connection consists in providing the type-channel beds with removable false bottoms or trays formed with suitable shoulders for the reception and support of the type-channels vertically, and in such manner that a whole series of type-containing channels may be simultaneously inserted into or removed from position with relation to the type-conduits in the apparatus. Thus while each channel may be readily and independently removed or replaced without disturbing the others, as heretofore, when it is desired to substitute an entirely new set of channels—as, for instance, when a different size or style of type is to be distributed—the change may be rapidly and conveniently effected without separating or unduly disturbing the series of channels already partially filled in such manner that they will remain in proper relative position to be subsequently returned to the apparatus to have the operation of filling completed.

In the present case, as in former patents referred to, the type-containing channels are arranged in two series (the right and left) extending upon opposite sides of a common central reciprocating double type-forwarding device or pusher. As heretofore, separate type-conduits, guards, &c., are provided for each series of channels; but we construct and arrange the parts so that a single series of type receiving and conducting plates, substantially such as heretofore used upon the right hand side of the apparatus, is utilized for the distribution of the types into both series of channels. To accomplish this we provide low stationary conduit-plates and guards upon each side of the type-forwarding mechanism with which the type-containing channels are arranged to coincide, as heretofore, and mount the carriage containing the series of type receiving plates upon vertical ways or rails, which extend longitudinally a sufficient distance upon either side of the center to allow the lower ends of the receiver face plates to be brought into coincidence with either of the lower stationary type-conduits. By this means we are enabled to distribute two distinct styles or kinds of types without disturbing the apparatus further than to slide the receiving-plates back or forth into communication with the approximate series of channels previously arranged in accordance; or the smaller letters, &c., in a font may be distributed, for instance, into the series of type-channels upon the left-hand side, while the corresponding capitals, &c., may be distributed into the series of type-containing channels upon the opposite or left-hand side of the apparatus, the carriage upon which the receiving-plates, face-plates, &c., are mounted being capable of convenient and rapid manipulation by the left hand of the distributer, while his right is engaged in securing and handling the types preparatory to their deposition with the receivers.

In our present construction we form the vertical receiver face-plate with grooves which coincide with and form the continuations of the type-passages in the receiver-plates, and provide the said face-plate with a hinged vertical cover or opposed plate formed with tongues or ribs, which enter the grooves in the face-plate more or less, according to the size of the types being distributed, the relative adjustment of the said two vertical plates being effected by suitable means upon the receiver-carriage. Heretofore we have used a stationary vertical conduit-plate formed with type-grooves, into which the tongues or ribs upon the face-plate projected more or less in a similar manner and for a similar purpose; but in adapting the receiver-carriage, &c., for use upon both sides of the apparatus, as before mentioned, we hinge the equivalent of the old vertical stationary conduit-plate to the front of the face-plate, and preferably reverse the arrangement of the tongues and grooves, as just described, thus rendering the vertical type-grooves conveniently accessible at all times.

Another feature of our present invention consists in so mounting the type forwarder or pusher that it may be adjusted vertically for the purpose of regulating the plane of its action with relation to the types in the type-containing channels.

Our invention also includes the combination and arrangement, with the type-receiver plates, of intermediate shield-plates or covers formed upon the under side, with tongues or ribs which coincide with and engage more or less the type-grooves in the receiving-plates, and in the special means of mounting and supporting the plates in their frame or carriage, and of adjusting them thereon with relation to each other.

We are aware that in our patent, No. 340,124, the under sides of the receiving-plates themselves are formed with tongues or projections which project into the type-passages in the plate below, and we do not seek to cover the feature of thus controlling the types, broadly, herein, but confine ourselves exclusively to the special construction of the auxiliary or intermediate plates.

Finally, our invention includes certain features of construction hereinafter set forth.

Figure 2:
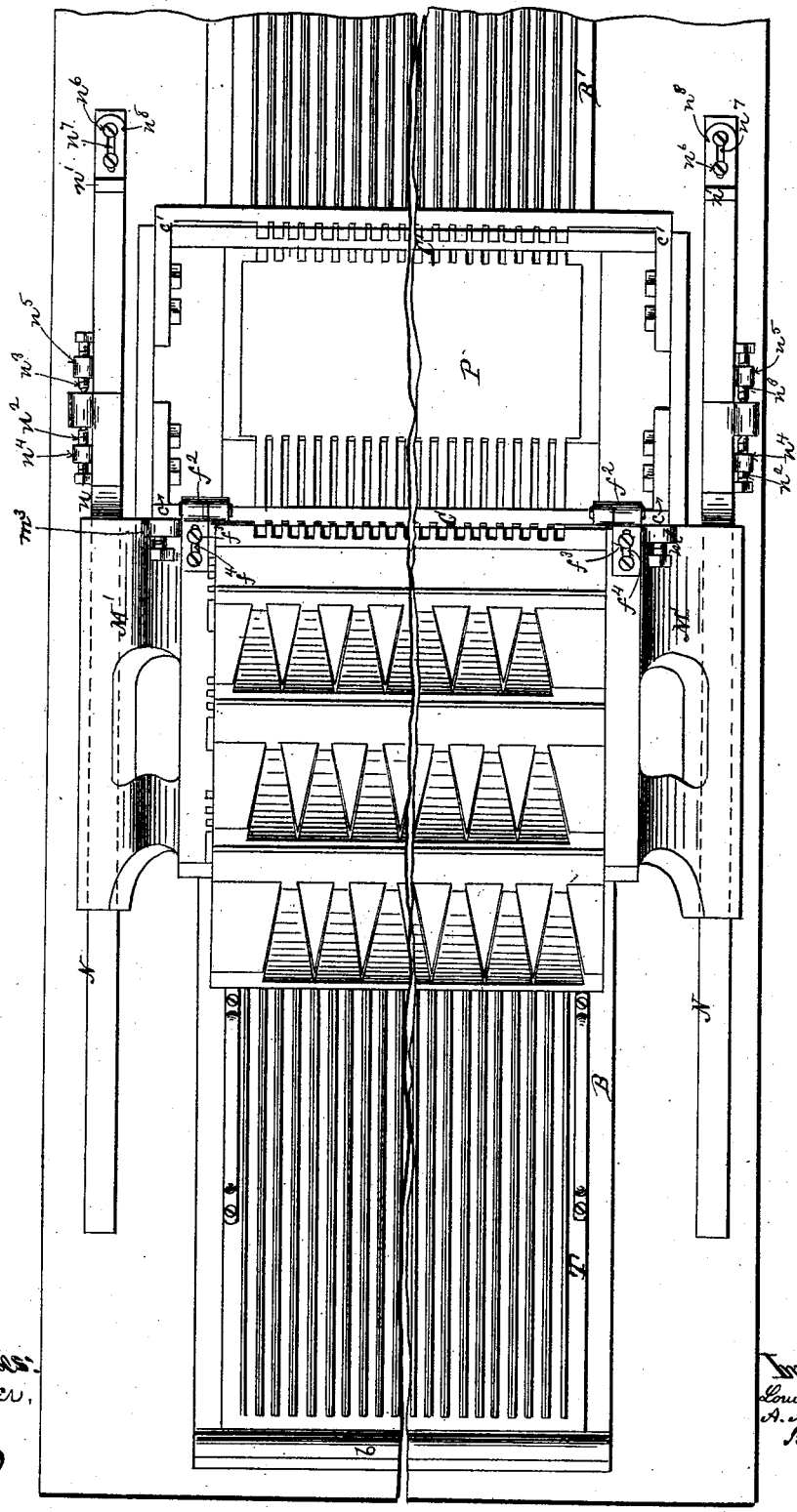

In the accompanying drawings, Figure 1 is a front elevation of the central portion and left-hand side of our improved distributing apparatus, a portion of the right hand side being broken away; Fig. 2, a plan of the apparatus, with the central portion and a portion of the right-hand side broken away; Fig. 3, a central longitudinal section of the parts shown in Figs. 1 and 2. Fig. 4 is a longitudinal section of the receiving end of one of the channels, illustrating the arrangement of the anti-backlash cord with relation to the pusher-finger. Fig. 5 is a vertical transverse section upon plane of line $x\,x$, Fig. 3, looking toward the receiver carriage. Fig. 6 is a transverse section of the series of type-receiving and intermediate plates and the side walls or standards between which they are supported, taken upon plane of line $y\,y$, Fig. 3. Fig. 7 is a vertical transverse section through the receiver-carriage with the plates removed, showing the series of parallel grooves in which the edges of the plates rest. Fig. 8 is an end view of one of the receiver-plates and its cover or intermediate plate. Fig. 9 is a front view of one extremity of a receiver-plate, and Fig. 10 a similar view of one extremity of an intermediate plate. Fig. 11 is a plan of the type-channel bed with its central portion broken away; Fig. 12, an edge view of the lower extremity of the same, showing means for adjusting said extremity vertically. Fig. 13 is a side elevation of the channel-tray. Fig. 14 is a horizontal section through the face-plates, the central portion being broken away; Fig. 15, an elevation of one of the type slugs.

In general construction and arrangement the apparatus is substantially the same as that shown and described in our patents previously referred to, and in the accompanying drawings only sufficient of the apparatus is shown to fully illustrate the improvements constituting our present invention. In practice the type-containing channels, beds, &c., are longer, and five receiving-plates, instead of three, are employed.

The type-forwarding mechanism is situated at or near the middle of the apparatus, being supported between the side pieces, $a\,a$, of the frame A, which latter may be of any suitable or convenient construction.

The type-channel beds B B' extend outward upon either side of the type-forwarding mechanism, as heretofore, but are pivotally suspended, as at $b\ b$, upon and between stationary parts of the frame at their inner ends, as illustrated in Figs. 3 and 11, while their outer ends are supported by vertically-adjustable rests $b'\ b'$. The vertical adjustment of the outer or lower extremities of the channel-beds may be effected in various ways, as preferred, the means shown in the drawings consisting of the vertical set screws $b^6\ b^6$, passing through the end bars, $a'$, of the frame A, and being locked in the desired position by the nuts $b^7$.

The bed-plates B B' are adapted to receive and support the false bottoms or trays T, upon which the type-containing channels are arranged. The trays T rest between the shoulders $b^3\ b^4$ at opposite ends of the bed-plates B B', and are themselves formed with the channel-retaining shoulders $t$ at the outer ends, and the centralizing and holding tongues or shoulders $t'$ at the opposite or inner ends, which enter the receiving ends of the channels and support them against lateral displacement at that end.

The type-forwarding mechanism consists of the usual double reciprocating comb-pusher, P, actuated by the levers $p\ p$, which are connected by the rods $p'\ p'$ with cranks or eccentrics situated upon a driving-shaft suitably arranged upon the under side of the apparatus, as heretofore. In order to regulate with accuracy the plane of action of the pusher P with relation to the receiving ends of the type-containing channels, we mount the pusher and its connections upon the frame in such manner that they are adjustable vertically. We do not wish to limit ourselves to any particular construction for accomplishing this vertical adjustment of the pusher, since it is obvious that it may be effected in various ways without deviating from the intent of our invention in this respect; but as shown in the drawings the comb-pusher P rests upon a horizontal bed or support, Q, which is secured at opposite ends to the frame A by set screws $q\ q$, which pass through elongated vertical slots $q'\ q'$, formed in the downwardly-projecting flanges Q' Q', the extensions $Q^2\ Q^2$ of which afford bearings for the opposite extremities of the shaft P', upon which the actuating-levers $p\ p$ are mounted. The requisite adjustment is effected (when the set-screws $q\ q$ are loosened) by the vertical adjusting screws $q^2\ q^2$ engaging with female screws formed in the lugs $q^3\ q^3$ upon a stationary part of the frame and bearing against the flanges Q' Q'.

Above the pusher P, and extending transversely across the frame upon either side of it, are the stationary vertical type-conduits C C', situated directly above the position of the receiving ends of the type-containing channels when the latter are in position upon their beds. Both the stationary type-conduits occupy the same horizontal plane and project upward but slightly above the receiving ends of the containing-channels, their office being to transfer the types from the lower ends of the movable face-plates F F' to the said containing-channels always at a prescribed point. One side wall of each conduit C is made adjustable horizontally by suitable means, for the purpose of varying the width of the type-channels, the sides $c\ c'$ in the drawings being formed with laterally-projecting flanges at either end, in which horizontal longitudinal slots $c^2\ c^2$ are provided for the passage of the set-screws which engage with female screw-threads formed in a stationary part of the frame.

In application No. 213,437 vertical conduits which are adjustable horizontally with relation to the stroke of the pusher are shown and described, and we herein expressly disclaim any adjustment of the conduits bodily for such purpose, and confine our present invention in this connection to the adjustment of the area of the type-passages, substantially as above set forth.

The type-receiving plates R and the intermediate plates, I, and face-plates F F' are supported in a movable carriage, M, which rests upon horizontal rails or ways N N, which extend upon opposite sides of the apparatus for the greater portion of its length, so that the receiving and face plates, &c., may be brought into communication with either one or the other of the stationary vertical type-conduits C C', as required.

The inner face-plate, F, is secured rigidly between the end standards, M' M', and constitutes what may be designated as the "front" side of the receiver-plate box or holder. In addition to being thus rigidly joined together by the face-plate F, the standards M' M' are united by a cross-bar, $m$, which also forms a convenient means for handling and controlling the carriage. The inner sides of the standards are formed with inclined parallel shoulders $r\ r$ at suitable distances apart for the reception and support of the receiver-plates R.

The positions of the receiver-plates R, are designed to be permanent within the carriage; but the intermediate or cover plates I are preferably variable in position with relation to the receiver-plates, and for this reason the inner sides of the standards M' M' are each formed with a series of narrow parallel ribs or flanges, $m'\ m'$, forming grooves $m^2\ m^2$ above the positions of the receiver-plates, so that by inserting the intermediate plates, I, into one or the other of the grooves $m^2\ m^2$ the under sides of the intermediate plates, I, may be situated nearer to or farther from the upper surface of the receiver-plates underneath, as preferred.

In practice the intermediate plates, I, are very thin and their grooves $m^2\ m^2$ are made as close together as possible, so as to admit of a sufficiently delicate degree of adjustment. The object of such adjustment is to regulate the height of the type-passages according to the size and character of the types to be distributed, and to effect this more perfectly we form the under sides of the intermediate plates with tongues or ribs $i$, coinciding in position with the type-passages $r'$ $r'$ in the receiving-plates. When the intermediate plates, I, are inserted in the grooves $m^2$ $m^2$, which hold them close to the face of the receiving-plates, the said tongues or ribs $i$ enter the type-passages $r'$ $r'$, and adapt them to the smaller sizes of types which would otherwise be liable to turn upon their longitudinal axes. In like manner the type grooves are increased in height by inserting the intermediate plates in the higher grooves $m^2$. Each groove $m^2$ is designed to correspond with a certain thickness of type to be distributed.

The upper ends of the intermediate plates, I, are turned upward at right angles or otherwise flanged, $i'$, so as to inclose and protect the space between the plates, and the latter are inserted in position in the carriage by first introducing the upper and then the lower plates in order, on account of the curvature of their lower ends, the tenons at their edges extending only from the straight portions of the plates, as shown in Figs. 8, 9, and 10.

The fixed face-plate F is formed with the type-grooves $f$, which coincide with and form continuations of the type-passages $r'$ $r'$ in the receiving-plates, and the swinging plate F' is formed with a series of coinciding tongues or ribs, $f'$, which enter the type-channels more or less and correspond in function to the ribs $i$ upon the under sides of the intermediate plates, I. The adjustment of the swinging face plate F' with relation to the fixed plate F may be accomplished in any desirable manner. As shown in the drawings, the bearings $f^2$ $f^2$, between and by which the swinging plate F' is pivotally suspended, are made adjustable horizontally upon the carriage by means of the set-screws $f^3$ $f^3$, longitudinal slots $f^4$ $f^4$ being formed in the bearings $f^2$ $f^2$, which permit the screws to pass through and engage female threads formed in the frame of the carriage. The lower end of the swinging plate F' is correspondingly regulated in position by means of the adjustable rests $m^3$ $m^3$, which hold the plates apart to the required degree at that point.

The lower ends of the face-plates F F' are in register or coincidence with the stationary conduits C C' when the forward ends of the standards M M are in contact with the stops or buffers $n$ $n'$. These buffers $n$ $n'$ may be arranged in various ways, preferably upon the rails N N, and are adjustable longitudinally with relation to said rails, so as to give accuracy in registering the plates F F' with the stationary conduits C C'. In order that they may be readily swung out of the way when it is desired to move the receiver-carriage M² over into communication with the right-hand stationary conduit, C', the first stops or buffers, $n$ $n$, are pivotally suspended between the two adjustable screws $n^2$ $n^3$, which engage with female screw-threads formed in the lugs $n^4$ $n^5$, formed upon the outer sides of the rail. The other or end stops or buffers, $n'$ $n'$, are fastened to the face of the rail by set-screws $n^6$ $n^6$, which pass through the longitudinal slots $n^7$ $n^7$, formed in the flanges $n^8$ $n^8$ of the stops, and engage with female screw-threads formed in the faces of the rails.

The slugs or type-preceders S are formed with inclined type edges $s$, which cause the types in the channels to conform to the angle thus created and contributed to by the inclination of the type-channel bed. It is true that heretofore the inclination of the type-channel beds alone has imparted a slight inclination from the vertical to the types in the channels, but for certain sizes of types, especially the smaller, the requisite angle could not thus be attained without unduly inclining the channels and endangering the too rapid descent of the types from the receiving to the outer ends.

To assist in causing the types to assume and maintain the angle $s$ of the slug, the friction-cords $d$ $d$ are arranged in the receiving ends of the channels in positions slightly below the plane of action of the pusher when the channels are in place in the apparatus, so that they tend to slightly retard the lower portions or heels of the types as they are forwarded under the action of the pusher. The stroke of the pusher is comparatively slight, projecting beyond the vertical floor $c^3$ of the conduits C C' a distance only equal to about the average thickness of a type, so that the last type, after being forwarded by the stroke of the pusher, is left in substantially the position indicated in Fig. 3, in which position its lower portion projects slightly into the path of the next succeeding type. It will thus be noticed that while the "throats" or ends of the vertical conduits C C' are left open and free for the reception of the types the latter in descending will encounter the inclined side of the last preceding types, and will be thereby made to slide down and assume the same angle as the latter. The fall of the types is thus checked gradually and all rebound and lateral turning is avoided, so that even the smallest types are landed gently and surely into proper position to be forwarded in the channels.

We make the ribs $i$ upon the intermediate plates, I, variable in projection, as indicated in Fig. 6—that is to say, we graduate them with reference to the difference in thickness between the individual type-characters in a single font in substantially the same manner shown and described in our application No. 191,824, upon the conduit-plates, and we also graduate the ribs upon the swinging face-plate F' in like manner, as indicated in Fig. 14.

Having thus described practicable means for carrying out our invention, we wish to state that we do not confine ourselves strictly to the exact form and construction of parts shown; but

What we claim as our invention, and desire to secure by Letters Patent, is—

1. A type-distributing apparatus substantially such as described, formed with vertical conduit-plates and a series of type-containing channels connecting therewith, the outer extremities of which are adjustable vertically, substantially in the manner and for the purpose described.

2. In a type-distributing apparatus, the combination and arrangement, substantially as herein shown and described, of a series of type-conduits, a series of type-containing channels for receiving the types from the said conduits, a removable tray formed with shoulders for the support of the said type-containing channels, and a base or frame upon which the said tray rests when in position in the distributer, said base or frame being formed with shoulders which support the tray and its type-containing channels in proper relation to the said type-conduits, for the purpose described.

3. In a type-distributing apparatus substantially such as described, the combination and arrangement, substantially as set forth, of the two stationary vertical type-conduits, the movable carriage and series of type-receiving plates supported thereon, and the supporting-frame formed with suitable ways which permit of the use of the said series of receivers in conjunction with either of the said stationary vertical type-conduits, for the purpose and substantially in the manner described.

4. In a type-distributing apparatus substantially such as described, the vertical type-conduits C C', provided with the horizontally-adjustable face-plates c c', for regulating the cross-area of the type-passages with relation to the thickness of the types, in combination with the series of receivers provided with the adjustable face-plates, substantially in the manner and for the purpose described.

5. In a type-distributing apparatus substantially such as described, a series of independently-removable type-receiving plates resting upon separate parallel ways and provided with a common rigid face-plate, substantially in the manner and for the purpose described.

6. In a type-distributing apparatus substantially such as described, the combination, with the series of type-receiving plates mounted upon a movable carriage and the series of intermediate shield-plates, of the series of parallel grooves in the sides of the carriage for the reception, support, and adjustment of the said intermediate shield-plates, substantially in the manner and for the purpose described.

7. In a type-distributing apparatus substantially such as described, the combination, with a series of receiver-plates mounted upon a movable carriage and provided with a fixed face-plate, substantially as described, of a hinged cover or auxiliary face-plate adapted to be swung upward away from the fixed face-plate, for the purpose and substantially in the manner described.

8. In a type-distributing apparatus substantially such as described, the combination, with a series of type-receiving plates provided with a common fixed face-plate formed with type-grooves, and with a hinged face-plate or cover formed with coinciding tongues or ribs, substantially in the manner and for the purpose described, of means, substantially as described, for adjusting the two face-plates with relation to each other, substantially in the manner and for the purpose described.

9. In a type-distributing apparatus substantially such as described, the combination, with the fixed vertical type-conduits C C', series of receiver-plates, and their movable frame or carriage, substantially as set forth, of adjustable stops or buffers, substantially such as described, for registering the said receivers with the said fixed vertical conduits, substantially in the manner and for the purpose described.

10. In a type-distributing apparatus substantially such as described, the combination, with a series of type-conduits and a series of type-containing channels, of a vertically-adjustable type forwarder or pusher arranged and operating substantially in the manner and for the purpose described.

11. In a type-distributing apparatus substantially such as described, the combination, with the type-forwarding mechanism, substantially such as described, of a type-channel provided at its type-receiving end with a slip of soft or elastic material arranged upon the side wall below the plane of action of the said forwarder, substantially in the manner and for the purpose described.

LOUIS K. JOHNSON.
A. AUGUSTUS LOW.

Witnesses:
WM. GARDNER,
PAUL H. BATE.